Dec. 16, 1930.     H. P. NIELSEN     1,785,421
BRAKE STRUCTURE FOR CASTER WHEELS
Filed Feb. 19, 1930
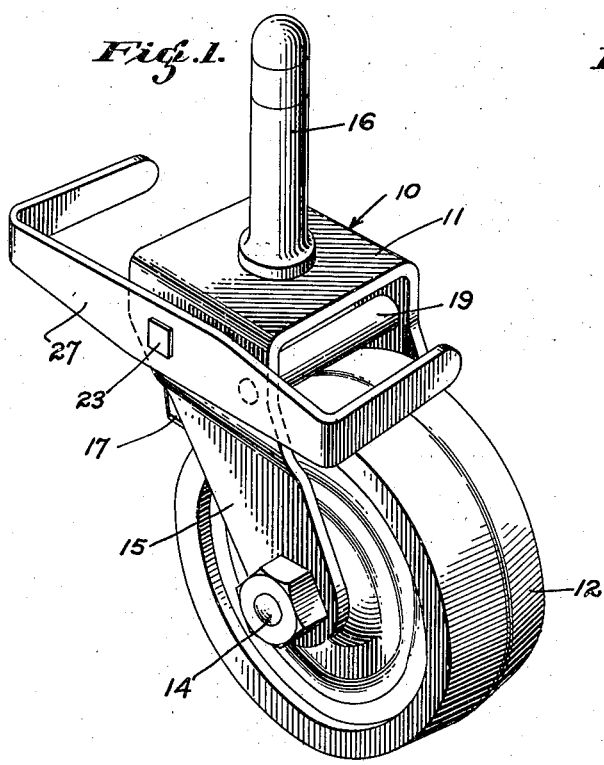
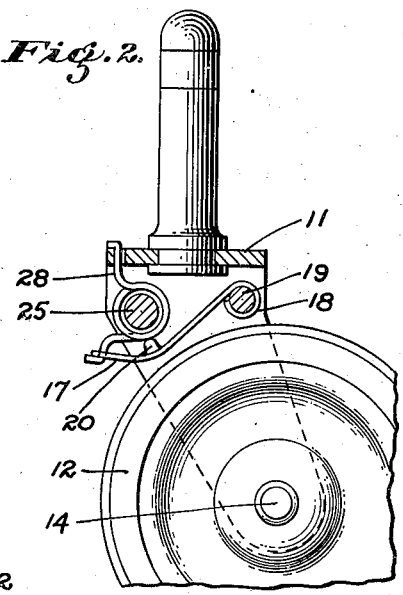
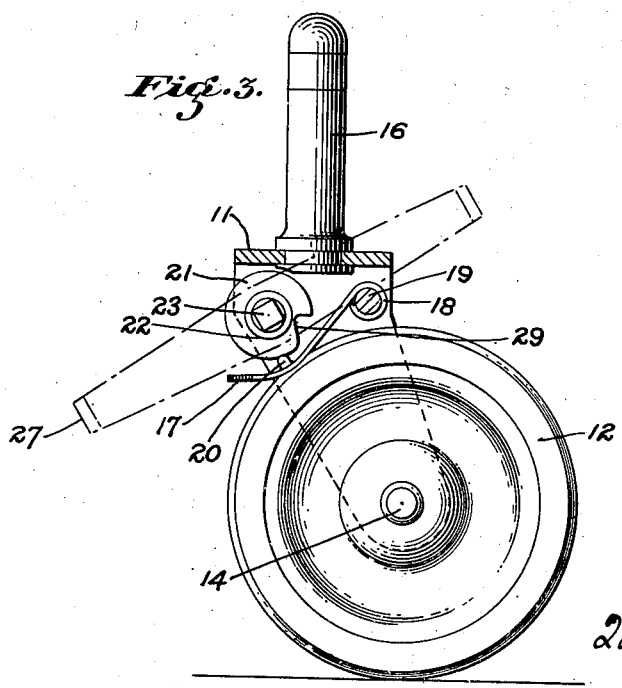
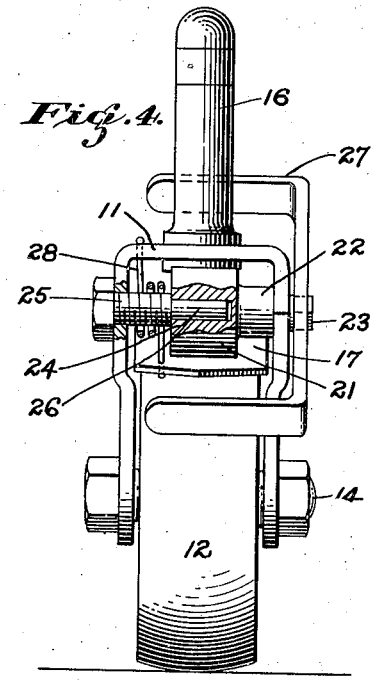
INVENTOR.
Hans P. Nielsen.
BY
Townsend, Loftus & Hitt
ATTORNEYS.

Patented Dec. 16, 1930

1,785,421

UNITED STATES PATENT OFFICE

HANS P. NIELSEN, OF ALAMEDA, CALIFORNIA, ASSIGNOR TO EAMES COMPANY, OF SAN FRANCISCO, CALIFORNIA, A CORPORATION OF CALIFORNIA

BRAKE STRUCTURE FOR CASTER WHEELS

Refiled for application Serial No. 247,048, dated January 16, 1928. This application filed February 19, 1930. Serial No. 429,839.

This application is a refile of my application entitled, Brake structure for caster wheels, filed January 16, 1928, Serial No. 247,048.

This invention relates to casters and particularly pertains to a brake structure therefor.

It is the principal object of the present invention to provide a generally improved brake for a caster capable of effectively preventing rotation of the wheel.

In carrying out the invention into practice, I provide a brake plate yieldably retained out of contact with the wheel. A cam is provided for cooperation with the brake plate and is capable of forcing the brake plate into contact with the wheel to prevent rotation thereof.

One form which the invention may assume is exemplified in the following description and illustrated by way of example in the accompanying drawings, in which:

Fig. 1 is a perspective view of a caster embodying the preferred form of my invention.

Fig. 2 is a sectional view through the fork of the caster showing the spring employed in maintaining the brake plate out of contact with the wheel.

Fig. 3 is a central section through the caster showing the braking mechanism.

Fig. 4 is a view in end elevation of the caster with parts in section to more clearly disclose the construction of certain parts.

Referring more particularly to the accompanying drawings 10 indicates a caster assembly. This assembly includes a fork 11 which embraces a wheel 12 of any suitable design. An axle 14 extends laterally between the lower ends of the legs 15 of the fork and the wheel 12 is mounted on this axle. At its upper end the fork 11 is fitted with a spindle 16 or other suitable device for mounting the caster on the bottom of a truck or other vehicle in connection with which casters are employed.

The present invention is particularly concerned with a brake mechanism to prevent rotation of the wheel relative to the fork and thus effectively arrest movement of the vehicle upon which the caster is mounted. The brake mechanism referred to comprises a pivotal brake plate 17 arranged between the legs of the fork 11 above the wheel. At one end this brake plate 17 is formed with a bearing 18 pivotally mounted on a pin 19 extending between and secured to the legs of the fork 11. The other end of the brake plate 17 is slightly arcuate and is adapted to engage the peripheral surface of the tire of the wheel 12.

It is desired to point out that the convex side of the arcuate portion of the brake plate 17 is contiguous to the wheel. On its upper surface the brake plate 17 is formed with a ridge or projection 20 adapted to engage the surface of a brake actuating cam 21. This cam 21 is arranged parallel to the brake plate 17 and is also disposed between the legs 15 of the fork 11. The mounting of the cam is best illustrated in Fig. 4.

Reference being had to this figure it is seen that the cam 21 is provided with a trunnion 22 having a reduced end 23 journaled in one leg 15 of the fork 11. A socket 24 is formed in the other end of the cam co-axially of the trunnion and a pin 25 is threaded through the other leg 15 of the fork 11, and is formed with a reduced portion 26 engaging the socket 24. This mounting of the cam 21 permits it to rotate about its axis. To operate the cam 21, the reduced end 23 of the cam trunnion 22 is squared and an operating lever 27 is secured on this squared portion. Therefore, it is obvious that oscillating movement of this lever 27 will revolve the cam about its axis.

Reference being had to Fig. 2 it will be seen that a coiled spring 28 is wrapped around the pin 25 with one of its ends anchored to the fork 11 and with its other end connected to the brake plate 17. This spring normally tends to maintain the brake plate 17 out of engagement with the wheel 12 and with its ridge or projection 20 in engagement with the surface of the cam 21. The cam 21 is formed with a longitudinal groove 29 adapted to be engaged by the projection 20 on the brake plate 17. When these two elements are in register the spring 28 will cause the brake plate 17 to be disengaged from the wheel, allowing the latter to revolve freely. However, when the cam is turned to bring its groove 29 out of register with the projection 20 on the brake plate 17, the latter will be pressed tightly into engagement with the wheel and effectively brake the same.

In operation of the device, it is constructed and assembled as shown in the drawings and mounted on the bottom of a vehicle employing casters. The cam 21 is so disposed that it will register with the projection 20, permitting the spring 28 to maintain the brake plate 17 out of contact with the wheel, allowing the latter to revolve freely. When desiring to put on the brake, one end of the lever 27 is depressed, throwing the groove 29 in the cam 21 out of register with the projection 20 on the brake plate 17 and causing the latter to be pressed tightly into engagement with the wheel; thus effectively preventing relative rotation between the wheel and fork.

To release the brake, the end of the lever which has been depressed is given an upward movement to revolve the cam 21. As soon as the projection 20 registers with the groove 29 in the cam, the brake will be released as the spring 28 will move the projection into engagement with the groove 29 and relatively latch the cam and brake plate together.

From the foregoing it is obvious that I have provided an effective brake mechanism for caster wheels and while I have shown the preferred form of my invention, it is to be understood that various changes may be made in its construction by those skilled in the art, without departing from the spirit of the invention as defined in the appended claims.

Having thus described my invention, what I claim and desire to secure by Letters Patent is:

1. A caster including a fork, a wheel embraced thereby, a pivotal brake member carried by the fork and adapted to engage the peripheral surface of the wheel, spring means constantly tending to maintain said brake member out of contact with the wheel, and operative cam means adapted to press said brake member into firm contact with the periphery of the wheel.

2. A caster structure including a fork, a wheel embraced thereby, a pivotal brake plate adapted to engage the peripheral surface of the wheel, a cam rotatably disposed between the legs of the fork, and a lever for operating said cam to cause the same to press the brake plate into contact with the wheel.

3. A caster structure including a fork, a wheel embraced thereby, a cam plate pivotally mounted between the legs of the fork and capable of engaging the periphery of the wheel, spring means constantly tending to maintain the brake plate out of contact with the wheel, a cam rotatably mounted between the legs of the fork in parallelism with the brake plate, a lever connected with said cam to revolve the same, said cam being adapted upon rotation to press said brake plate into firm contact with the wheel.

HANS P. NIELSEN.